(12) United States Patent
Azam et al.

(10) Patent No.: US 11,232,765 B2
(45) Date of Patent: Jan. 25, 2022

(54) MONITOR CALIBRATION

(71) Applicant: HEWLETT-PACKARD DEVELOPMENT COMPANY, L.P., Spring, TX (US)

(72) Inventors: Syed S Azam, Houston, TX (US); Greg Staten, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/482,276

(22) PCT Filed: Jul. 13, 2017

(86) PCT No.: PCT/US2017/041921
§ 371 (c)(1),
(2) Date: Jul. 31, 2019

(87) PCT Pub. No.: WO2019/013802
PCT Pub. Date: Jan. 17, 2019

(65) Prior Publication Data
US 2020/0184924 A1 Jun. 11, 2020

(51) Int. Cl.
*G09G 5/06* (2006.01)
*G01J 3/50* (2006.01)

(52) U.S. Cl.
CPC ............... *G09G 5/06* (2013.01); *G01J 3/506* (2013.01); *G09G 2320/0242* (2013.01);
(Continued)

(58) Field of Classification Search
CPC .... G09G 5/06; G09G 2320/0242; G01J 3/506
(Continued)

(56) References Cited

U.S. PATENT DOCUMENTS 6,950,109 B2 * 9/2005 Deering ................ G06F 3/1431
345/589
8,405,674 B2 * 3/2013 Sakai .................... G01J 1/4204
345/589
(Continued)

FOREIGN PATENT DOCUMENTS

| AU | 2015325785 | 4/2017 |
| CN | 106796774 | 5/2017 |
| EP | 2908309 | 8/2015 |

OTHER PUBLICATIONS

Cazes, A. N. et al, Implementation of a Color Calibration Method for Liquid Crystal Displays, Apr. 30, 2001 < http://proceedings.spiedigitallibrary.org/proceeding.aspx?articleid=903361 >.
(Continued)

*Primary Examiner* — Hai Tao Sun
(74) *Attorney, Agent, or Firm* — Brooks Cameron & Huebsch PLLC (57) ABSTRACT

Examples herein relate to monitor calibration. In some examples, monitor calibration can include a scaler processing resource and a memory resource storing machine readable instructions to cause the scaler processing resource to record, by a sensor included on a monitor, color measurements of the monitor in response to receiving record instructions from an external computing device, transmit the recorded color measurements to the external computing device, receive calibration instructions from the external computing device based on the recorded color measurements, and calibrate the monitor using the calibration instructions received from the external computing device.

13 Claims, 5 Drawing Sheets

(52) U.S. Cl.
CPC ............... *G09G 2320/0693* (2013.01); *G09G 2360/145* (2013.01); *G09G 2370/022* (2013.01)

(58) Field of Classification Search
USPC ........................................................ 345/589
See application file for complete search history.

(56) References Cited

U.S. PATENT DOCUMENTS

| | | | |
|---|---|---|---|
| 8,582,034 | B2 | 11/2013 | Kwong |
| 9,516,288 | B2 | 12/2016 | Holub |
| 2006/0280360 | A1* | 12/2006 | Holub .................. H04N 17/045 382/162 |
| 2007/0091114 | A1 | 4/2007 | Kwak et al. |
| 2007/0132997 | A1 | 6/2007 | Chuang |
| 2011/0075146 | A1 | 3/2011 | Moroney et al. |
| 2012/0293400 | A1 | 11/2012 | Matsubayashi |
| 2014/0125818 | A1 | 5/2014 | Friend |
| 2014/0159992 | A1 | 6/2014 | Cai et al. |
| 2014/0292616 | A1 | 10/2014 | Fear et al. |
| 2015/0317928 | A1 | 11/2015 | Safaee-Rad et al. |

OTHER PUBLICATIONS

Mystrica Ltd., "Practical Solutions", (n.d.). Retrieved Jun. 12, 2017, from http://www.mystrica.com/Colorimeter, 1 page.
Eizo Corporation "Color Management Monitors", Oct. 31, 2014, XP 055705292, whole document.

* cited by examiner

MONITOR CALIBRATION

BACKGROUND

Monitors may be used to display information, such as a user interface and/or media, among other information. Monitors may be used to display information in different environments. In some examples, a monitor may be used to display medical information in a medical facility. In some examples, a monitor may be used to display animated media.

DETAILED DESCRIPTION

Monitors may display information. The accuracy of which may depend on the colors displayed on displays of the monitors. In other words, the accuracy of some displayed information can depend on the accuracy of the colors rendered on the display of the monitor.

The accuracy of the colors displayed by a display of a monitor may change. Such monitors may be calibrated at various times to ensure the accuracy of the colors displayed by the monitor. As used herein, the term "monitor" can, for example, refer to an output device which can display information via a display. A monitor may include a television, computer monitor, mobile device screen, other type of display device, or any combination thereof, which can receive a video signal. The display may be cathode ray tube (CRT) monitor, a liquid crystal display (LCD) monitor, an organic light-emitting diode (OLED) monitor, a micro LED (µLED) monitor, among other types of monitors. As used herein, the term "display" can, for example refer to a graphical user interface (GUI) of a monitor which can present information to a user. The GUI can provide and/or receive information to and/or from the user. In some examples, the display can be a touch-screen display.

In some approaches, calibration of monitors may include manually setting up external sensors to take sensor measurements and/or processing such sensor measurements by the monitor. However, external sensors produce external sensor measurements which may be affected by ambient light. Moreover, in such approaches, the monitor may have to include expensive processing capabilities to process sensor measurements locally. Further, calibration of groups of monitors may be a time consuming process.

Monitor calibration according to the disclosure can allow for an integrated sensor in the monitor to record sensor measurements, and an external computing device to determine calibration instructions for a monitor or a group of monitors. The integrated sensor can be integrated via a sensor arm in a bezel of the monitor, can be fixed in a corner of multiple corners of the display of the monitor, among other integration methods. Monitor calibration according to the disclosure can allow for remote activation of integrated sensors with external generation of calibration instructions while avoiding concerns with sensor measurements being affected by ambient lighting.

Figure 1:
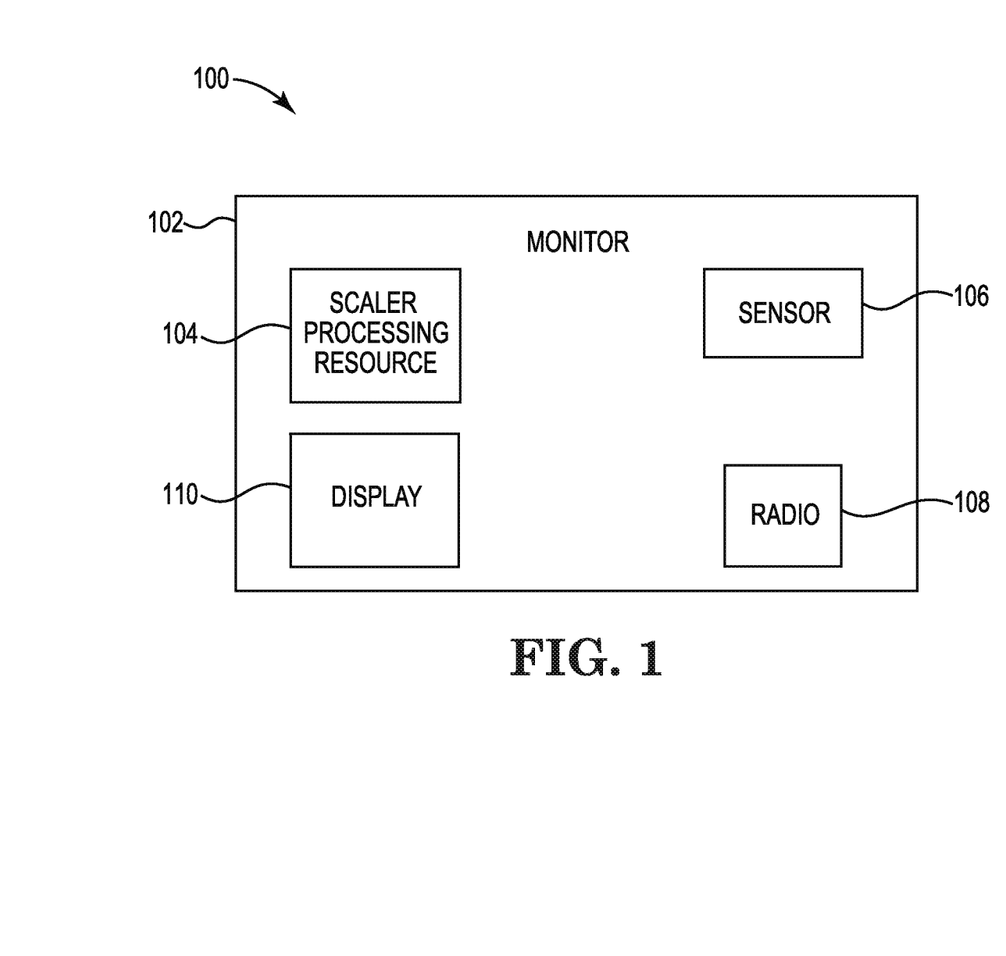
FIG. 1 illustrates an example of a monitor suitable for monitor calibration consistent with the disclosure.

FIG. 1 illustrates an example of a monitor 102 suitable for monitor calibration consistent with the disclosure. Monitor 102 can include a scaler processing resource 104, sensor 106, radio 108, and display 110.

Monitor 102 can record color measurements of monitor 102 by a sensor. As used herein, the term "sensor" can, for example, refer to a device to detect events or changes in an environment. The sensor can be a colorimeter, spectrometer, spectroradiometer, and/or other such sensors. For example, as illustrated in FIG. 1, monitor 102 can include a colorimeter. As used herein, the term "colorimeter" can, for example refer to a device that can measure color values displayed on a screen.

Sensor 106 can record color measurements of monitor 102. As used herein, the term "color measurements" can, for example, refer to various types of measurements a colorimeter can make regarding a display. For instance, color measurements may include luminance, white point, electro-optical transfer function (EOTF), gamma, tone, rolloff, and/or gamut measurements, among other types of color measurements.

Sensor 106 can record color measurements at various points on display 110 of monitor 102. Scaler processing resource 104 can cause sensor 106 can record color measurements of monitor 102 in response to receiving record instructions from an external computing device, as is further described in connection with FIG. 2. As used herein, the term "record instructions" can, for example, refer to instructions to cause a sensor to record color measurements of a monitor. As used herein, the term "scaler processing resource" can, for example, refer to a processing resource that processes one datum at a time. Typical data items may include integers or floating point numbers. As used herein, the term "computing device" can, for example, refer to a server, a laptop computer, a desktop computer, or a mobile device (e.g., a smart phone, tablet, personal digital assistant, smart glasses, a wrist-worn device, etc.), among other types of computing devices.

Recording color measurements of monitor 102 can include a sensor arm connected to sensor 106 moving sensor 106 to various different locations on display 110 of monitor 102. As used herein, the term "sensor arm" can, for example, refer to a mechanism allowing sensor 106 to reach various different locations of display 110 of monitor 102. The sensor arm can allow sensor 106 to take multiple color measurements of display 110 of monitor 102 at different locations on display 110.

Monitor 102 can transmit the recorded color measurements to an external computing device. Monitor 102 can cause scaler processing resource 104 to transmit the recorded color measurements via radio 108. That is, monitor 102 may be interconnected with the external computing device via radio 108 such that monitor 102 can transmit the recorded color measurements to the external computing device. As used herein, the term "interconnect" or used descriptively as "interconnected" can, for example, refer to a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein; the term "radio" can; for example, refer to hardware that can transmit and/or receive information via radio signals. Radio 108 can transmit the recorded color measurements to the external computing device via a network relationship. That is, radio 108 and the external computing device can be wirelessly interconnected via a network relationship. As used herein, the term "network relationship" can, for example, refer to a local area network (LAN), a wireless local area network (WLAN), a virtual local area network (ULAN), wide area network (WAN), personal area network (PAN), a distributed computing environment (e.g., a cloud computing environment), storage area network (SAN), Metropolitan area network (MAN), a cellular communications network, Bluetooth, near field communication (NFC), and/or the Internet, among other types of network relationships.

As used herein, the term "wireless local area network" (WLAN) can, for example, refer to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network. For example, radio 108 can wirelessly transmit the recorded color measurements from monitor 102 to the external computing device via a WLAN, Bluetooth, NFC, etc.

Monitor 102 can cause scaler processing resource 104 to receive calibration instructions from the external computing device based on the recorded color measurements. For example, the recorded color measurements of monitor 102 may not be of a threshold color, and monitor 102 may have to calibrate display 110 such that the colors displayed by monitor 102 are more accurate. The term "calibration instructions" can, for example, refer to instructions to cause monitor 102 to calibrate color settings of monitor 102.

Monitor 102 can receive calibration instructions wirelessly from the external computing device via radio 108. For example, monitor 102 can wirelessly receive calibration instructions via a WLAN, Bluetooth, NFC, etc.

Monitor 102 can calibrate display 110 using the calibration instructions received from the external computing device. For example, monitor 102 can change color settings, make color corrections, etc. using the calibration instructions received by radio 108. Calibration instructions can include various types of lookup tables, as is further described in connection with FIG. 2.

Monitor calibration, according to the disclosure, can allow for remote calibration of color settings of monitors without using external sensors. Analysis of sensor measurements received from sensors built in to monitors can be performed by an external computing device, reducing the computing power included in each monitor, which may reduce monitor costs.

Figure 2:
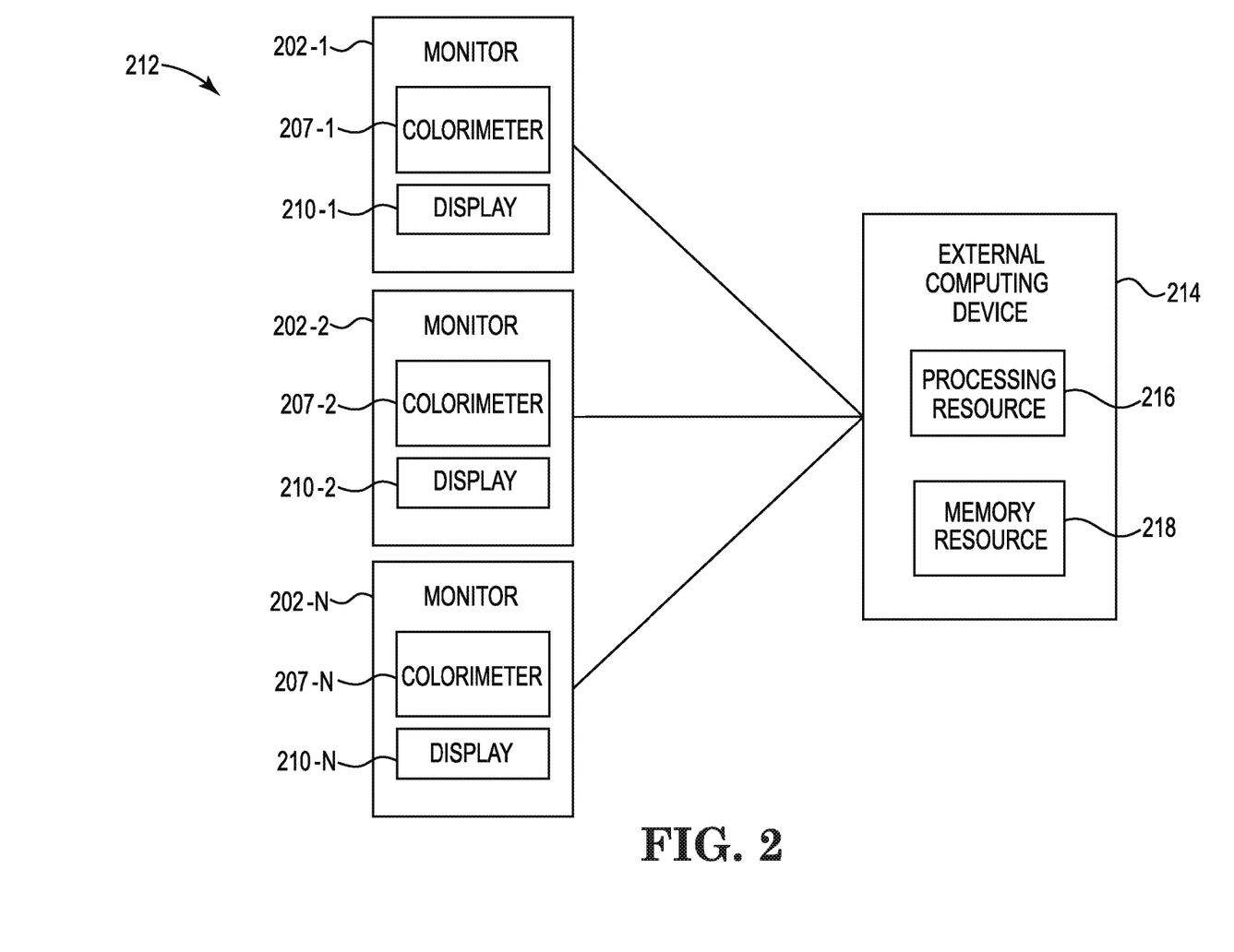
FIG. 2 illustrates an example of a system suitable for monitor calibration consistent with the disclosure.

FIG. 2 illustrates an example of a system 212 suitable for monitor calibration consistent with the disclosure. System 212 can include monitors 202-1, 202-2, 202-N (referred to collectively as monitors 202) and external computing device 214. Monitors 202 can each respectively include colorimeters 207-1, 207-2, 207-N and displays 210-1, 210-2, 210-N. External computing device 214 can include a processing resource 216 and a memory resource 218.

As illustrated in FIG. 2, system 212 can include monitors 202 each including colorimeters 207. Each monitor 202 can record color measurements of their respective displays 210 via their respective colorimeters 207. For example, monitor 202-1 can record color measurements of display 210-1 via colorimeter 207-1, and monitor 202-2 can record color measurements of display 210-2 via colorimeter 207-2.

Monitors 202 do not include a system on chip (SOC) processing resource. As used herein, the term "SOC processing resource" can, for example, refer to an integrated circuit that integrates components of a computing device such as a microcontroller/microprocessor, graphics processing unit (GPU), M-Fi module, coprocessor, etc.

Each monitor 202 can include a scaler processing resource (e.g., scaler processing resource 104, described in connection with FIG. 1). The scaler processing resource of each monitor 202 can cause each monitor 202 to record color measurements of their respective displays 210 via their respective colorimeters 207. For example, monitor 202-1 can include a scaler processor that can cause monitor 202-1 to record color measurements of display 210-1 via colorimeter 207-1.

Each monitor 202 can include a radio (e.g., radio 108, described in connection with FIG. 1). The radio of each monitor 202 can wirelessly transmit the respective recorded color measurements of each monitor 202 to external computing device 214. For example, a radio included in monitor 202-2 can wirelessly transmit color measurements recorded of display 210-2 via colorimeter 207-2 to external computing device 214.

External computing device 214 can analyze the recorded color measurements received from each monitor of monitors 202. For example, external computing device 214 can analyze recorded color measurements received from monitor 202-1.

External computing device 214 can generate calibration instructions for each monitor of the monitors 202 based on the recorded color measurements. For example, the recorded color measurements can be analyzed using lookup tables that include color calibration information. As used herein, the term "lookup table" can, for example, refer, to an array data structure including a collection of elements, each identified by at least one array index. Generating the calibration instructions for each monitor of the monitors 202 can include generating lookup tables that can include color calibration information for each monitor of the monitors 202. The generated lookup tables can be based on the recorded color measurements of each monitor of the monitors 202, and can include various types of color calibration information. Lookup tables can include Pre-DeGamma lookup tables, Post/ReGamma lookup tables, shaper lookup tables, translation lookup tables, color mapping lookup tables, and/or mathematical matrices, among other types of lookup tables.

External computing device 214 can transmit the generated calibration instructions to monitors 202. For example, external computing device 214 can wirelessly transmit calibration instructions to monitors 202.

In some examples, external computing device 214 can transmit the generated calibration instructions to monitors 202 in response to received recorded color measurements exceeding a predetermined threshold. For instance, external computing device 214 can transmit generated calibration instructions to monitor 202-1 in response to the recorded color measurements received from monitor 202-1 exceeding a predetermined threshold (e.g., the monitor 202-1 has to have its color settings calibrated). In some examples, external computing device 214 can refrain from transmitting generated calibration instructions to monitor 202-1 in response to the recorded color measurements received from monitor 202-1 not exceeding a predetermined threshold. In this manner, external computing device 214 can refrain from causing monitors 202 from calibrating when calibration may not be called for.

In some examples, external computing device 214 can transmit the generated calibration instructions at a predetermined time. For example, external computing device 214 can be set to transmit generated calibration instructions to monitors 202 at 3:00 AM, when the monitors 202 may not be in use so as not to not disrupt activities that may rely on monitors 202. In some examples, external computing device 214 can transmit generated calibration instructions at a predetermined frequency. For instance, external computing device 214 can be set to transmit generated calibration instructions once a day at 3:00 AM, once a week, and/or at any other frequency and/or any other specified time.

Monitors 202 can wirelessly receive the generated calibration instructions from external computing device 214. For example, monitors 202 can wirelessly receive the generated calibration instructions from external computing device 214 via a radio included in each of monitors 202.

In some examples a monitor of monitors 202 may be included in a sub-group of monitors 202. For example, monitors 202-1 and 202-2 may be a sub-group of the rest of monitors 202 (e.g., monitor 202-N is not included in the sub-group).

External computing device 214 can transmit calibration instructions to monitors included in the sub-group of monitors 202. Continuing with the example from above, external computing device 214 can transmit calibration instructions to monitors 202-1 and 202-2, but not to monitor 202-N.

Transmitting calibration instructions to monitors included in a sub-group may be beneficial in such examples where a sub-group of monitors may be utilized for a similar purpose that may be different from the remaining monitors 202. For example, a sub-group of monitors may be used in a radiology department of a health facility, and a different sub-group of monitors may be used in a surgery department of the health facility. The sub-group of monitors used in the radiology department may have different purposes and therefore may have different calibration specifications for color settings. Transmitting calibration instructions to a sub-group of monitors can allow for ease of calibration of such monitors, without modifying color settings for other sub-groups of monitors.

Monitors 202 may calibrate their respective displays 210 using the generated calibration instructions received from external computing device 214. For example, monitor 202-1 may calibrate display 210-1 based on the generated lookup tables included in the generated calibration instructions received from external computing device 214. Calibration of displays 210 may include modification of color settings of monitors 202 utilizing the generated lookup tables included in the generated calibration instructions.

In some examples, monitors 202 can utilize lookup tables to perform conversions from gamma-corrected to linear space (deGamma) or from linear to gamma-corrected space (reGamma) in order to modify color settings of monitors 202 by performing gamut manipulations using matrix multiplication. In some examples, monitors 202 can utilize lookup tables to convert signal data from integer form (e.g., 0 to 4095) to floating point form (e.g., 0.0 to 1.0) in order to modify color settings of monitors 202. The scaler processing resource of each monitor 202 can cause the calibration of displays 210 using the generated calibration instructions, including the generated lookup tables, received from external computing device 214.

For example, monitor 202-1 can calibrate display 210-1 utilizing calibration instructions generated by external computing device 214 for monitor 202-1. The generated calibration instructions can include lookup tables generated by external computing device 214 for monitor 202-1 based on the recorded color measurements of monitor 202-1. For instance, monitor 202-1 can calibrate display 210-1 utilizing Pre-DeGamma lookup tables, Post/ReGamma lookup tables, shaper lookup tables, translation lookup tables, color mapping lookup tables, and/or mathematical matrices generated by external computing device 214 for monitor 202-1 based on the recorded color measurements of monitor 202-1, among other types of lookup tables and/or combinations of lookup tables.

The lookup tables generated by external computing device 214 for each monitor 202 can be different. For example, recorded color measurements of monitor 202-1 may be different than recorded color measurements of monitor 202-2. Since the lookup tables generated by external computing device 214 can be based on the recorded color measurements of each monitor 202, lookup tables generated for monitor 202-1 can be different from lookup tables generated for monitor 202-2.

External computing device 214 can include a processing resource 216 and a memory resource 218. Processing resource 216 may be a central processing unit (CPU), a semiconductor based microprocessor, and/or other hardware devices suitable for retrieval and execution of machine-readable instructions stored in a memory resource 218. Processing resource 216 may fetch, decode, and execute the instructions. As an alternative or in addition to retrieving and executing the instructions, processing resource 216 may include a plurality of electronic circuits that include electronic components for performing the functionality of the instructions.

Memory resource 218 may be any electronic, magnetic, optical, or other physical storage device that stores executable instructions and/or data. Thus, memory resource 218 may be, for example, Random Access Memory (RAM), an Electrically-Erasable Programmable Read-Only Memory (EEPROM), a storage drive, an optical disc, and the like. Memory resource 218 may be disposed within external computing device 214, as shown in FIG. 2. Additionally and/or alternatively, memory resource 218 may be a portable, external or remote computing storage medium, for example, that allows external computing device 214 to download the instructions from the portable/external/remote storage medium.

Figure 3:
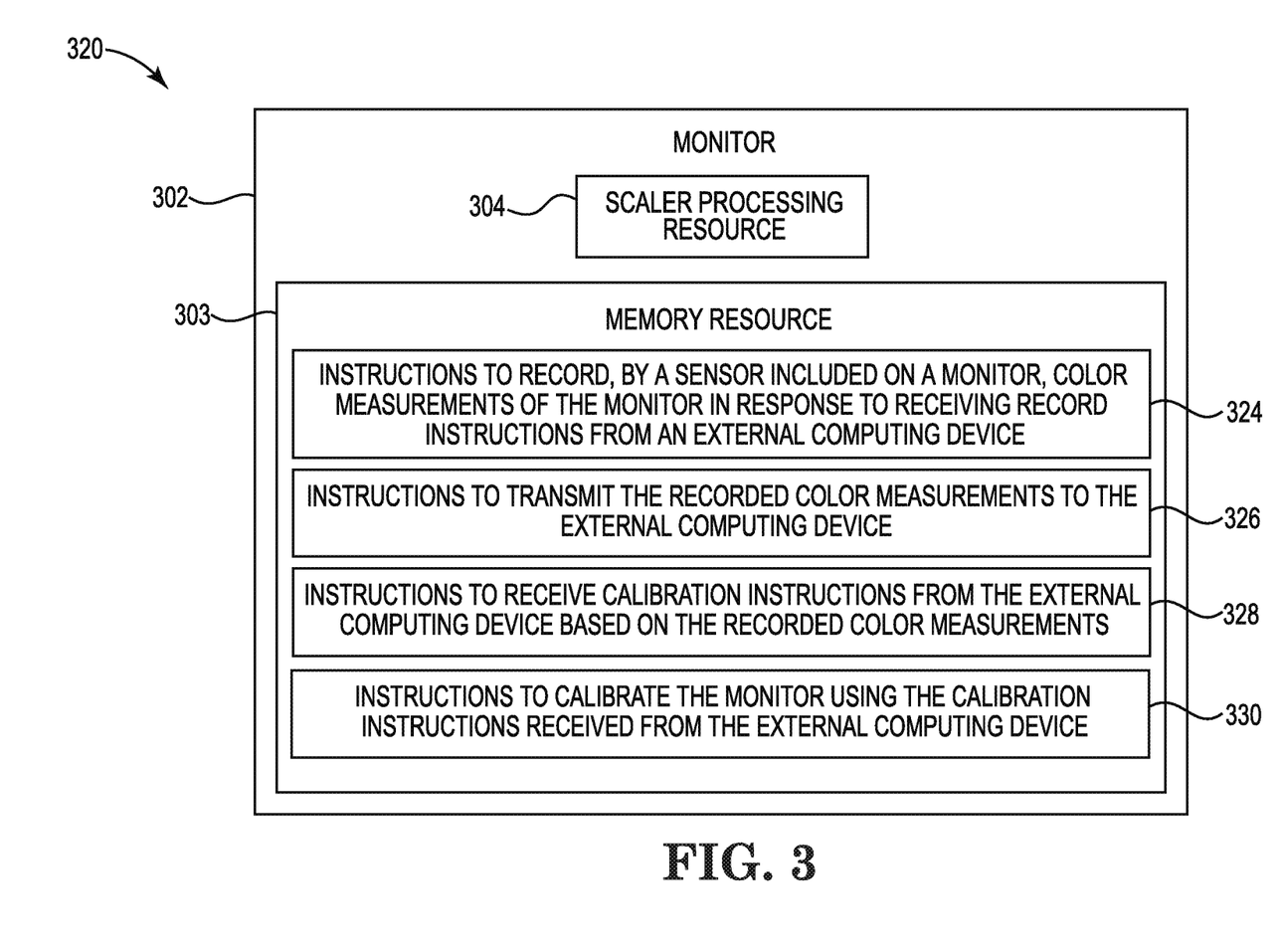
FIG. 3 illustrates a block diagram of an example of a system suitable for monitor calibration consistent with the disclosure.

FIG. 3 illustrates a block diagram of an example of a system 320 suitable for monitor calibration consistent with the disclosure. System 320 can include a monitor 302 (e.g., monitor 102, previously described in connection with FIG. 1). Monitor 302 can include a scaler processing resource 304 (e.g., scaler processing resource 104, previously described in connection with FIG. 1) and a memory resource 303. Memory resource 303 can include machine readable instructions, including record instructions 324, transmit instructions 326, receive instructions 328, and calibrate instructions 330.

Scaler processing resource 304 may be a central processing unit (CPU), a semiconductor based microprocessor, and/or other hardware devices suitable for retrieval and execution of machine-readable instructions 324, 326, 328, 330 stored in a memory resource 303. Scaler processing resource 304 may fetch, decode, and execute instructions 324, 326, 328, 330. As an alternative or in addition to retrieving and executing instructions 324, 326, 328, 330, scaler processing resource 304 may include a plurality of electronic circuits that include electronic components for performing the functionality of instructions 324, 326, 328, 330.

Memory resource 303 may be any electronic, magnetic, optical, or other physical storage device that stores executable instructions 324, 326, 328, 330 and/or data. Thus, memory resource 303 may be, for example, Random Access Memory (RAM), an Electrically-Erasable Programmable Read-Only Memory (EEPROM), a storage drive, an optical disc, and the like. Memory resource 303 may be disposed within monitor 302, as shown in FIG. 3. Additionally and/or alternatively, memory resource 303 may be a portable, external or remote storage medium, for example, that allows monitor 302 download the instructions 324, 326, 328, 330 from the portable/external/remote storage medium Scaler processing resource 304 may execute record instructions 324 to record by a sensor included on a monitor, color measurements of the monitor in response to receiving record instructions from an external computing device. The sensor can be a colorimeter. For example, the monitor can cause a colorimeter to record color measurements of the monitor in response to receiving record instructions from the external computing device.

Scaler processing resource 304 may execute transmit instructions 326 to transmit the recorded color measurements to the external computing device. The monitor may transmit the recorded color measurements to the external computing device wirelessly via a radio.

Scaler processing resource 304 may execute receive instructions 328 to receive calibration instructions from the external computing device based on the recorded color measurements. The monitor may receive the calibration instructions from the external computing device wirelessly via a radio.

Scaler processing resource 304 may execute calibrate 330 to calibrate the monitor using the calibration instructions received from the external computing device. For example, the monitor can modify color settings of the monitor using the calibration instructions received from the external computing device.

Figure 4:
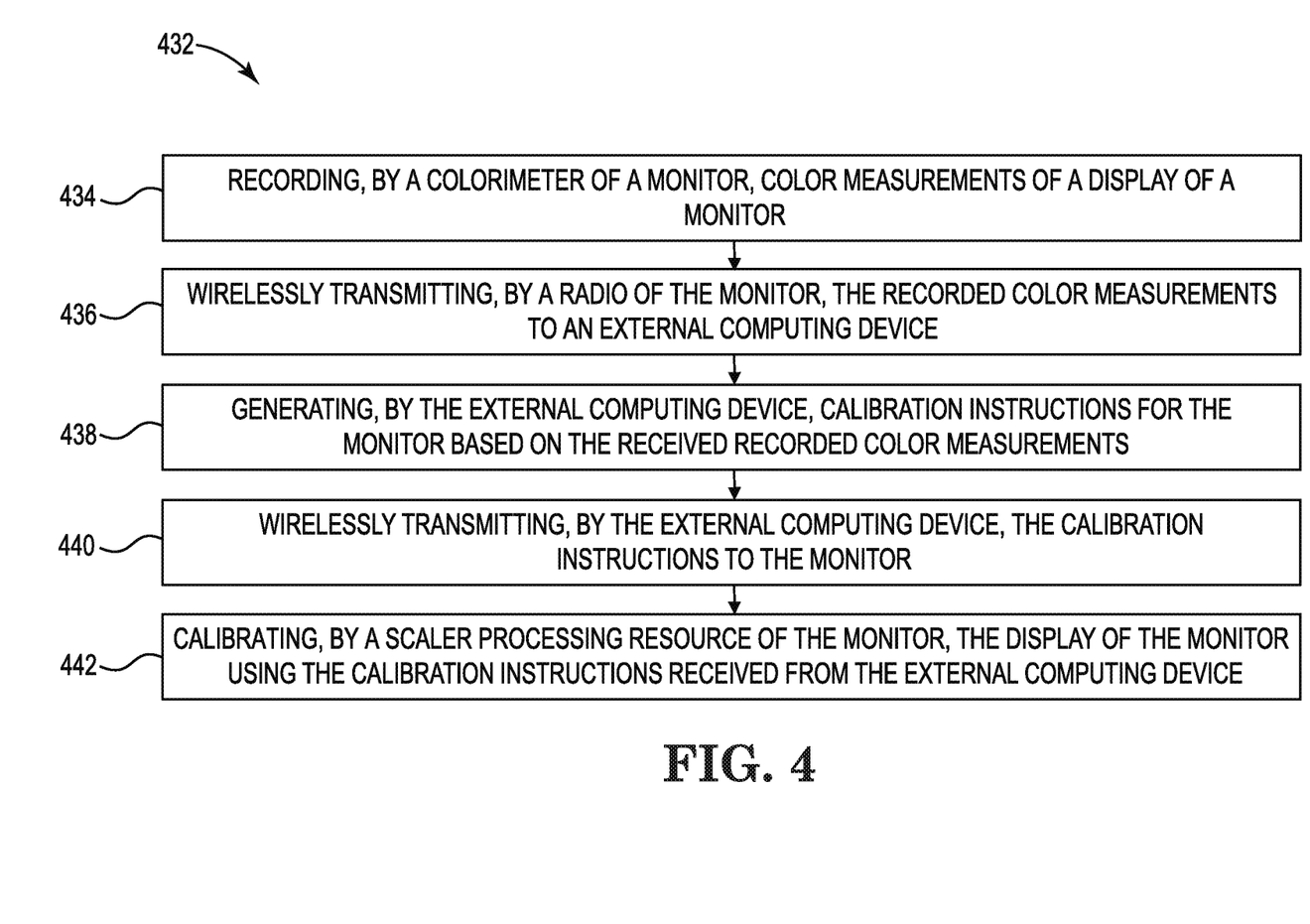
FIG. 4 illustrates an example of a method suitable for monitor calibration consistent with the disclosure.

FIG. 4 illustrates an example of a method 432 suitable for monitor calibration consistent with the disclosure. For example, method 432 can be performed by a monitor (e.g., monitor 102, 202, described in connection with FIGS. 1 and 2, respectively) and an external computing device (e.g., external computing device 214, previously described in connection with FIG. 2) to calibrate a monitor.

At 434, the method 432 includes recording, by a colorimeter of a monitor, color measurements of a display of a monitor. For example, the colorimeter can record luminance, white point, electro-optical transfer function (EOTF), gamma, tone, rolloff, and/or gamut measurements, among other types of color measurements of a display of a monitor.

At 436, the method 432 includes wirelessly transmitting, by a radio of the monitor, the recorded color measurements to an external computing device. For example, the monitor can include a radio to wirelessly transmit the recorded color measurements to the external computing device via a network relationship.

At 438, the method 432 includes generating, by the external computing device, calibration instructions for the monitor based on the received recorded color measurements. The external computing device can utilize lookup tables that include color calibration information to generate the calibration instructions based on the received recorded color measurements.

At 440, the method 432 can include wirelessly transmitting, by the external computing device, the calibration instructions to the monitor. The external computing device can wirelessly transmit the calibration instructions to the monitor via the network relationship. The monitor can receive the calibration instructions from the external computing device via the radio of the monitor.

At 442, the method 432 can include calibrating, by a scaler processing resource of the monitor, the display of the monitor using the calibration instructions received from the external computing device. For example, the monitor can modify color settings of the monitor using the calibration instructions received from the external computing device.

Figure 5:
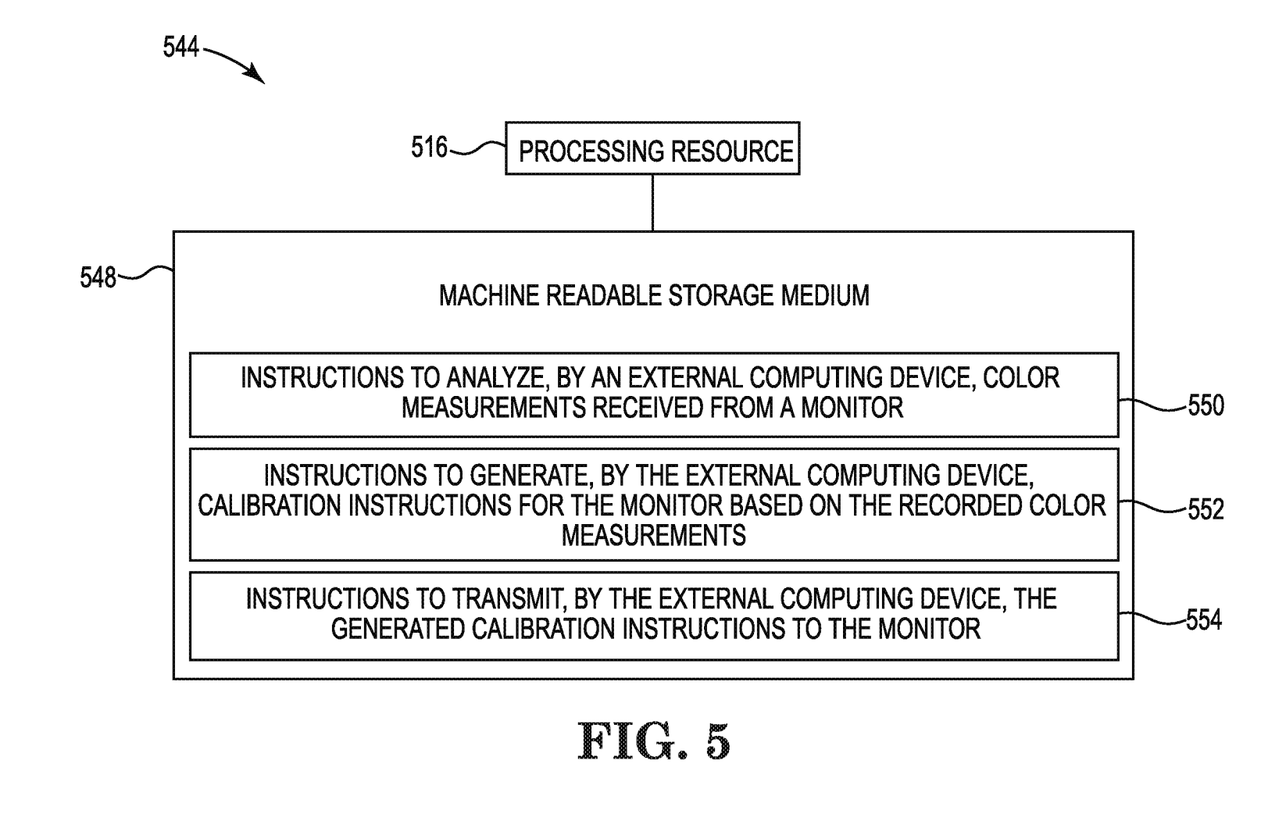
FIG. 5 illustrates a block diagram of an example of a system suitable for monitor calibration consistent with the disclosure.

FIG. 5 illustrates a block diagram of an example of a system 544 suitable for monitor calibration consistent with the disclosure. In the example of FIG. 5, system 544 includes a processing resource 516 (e.g., processing resource 216, described in connection with FIG. 2) and a machine readable storage medium 548. Although the following descriptions refer to an individual processing resource and an individual machine readable storage medium, the descriptions may also apply to a system with multiple processing resources and multiple machine readable storage mediums. In such examples, the instructions may be distributed across multiple machine readable storage mediums and the instructions may be distributed across multiple processing resources. Put another way, the instructions may be stored across multiple machine readable storage mediums and executed across multiple processing resources, such as in a distributed computing environment.

Processing resource 516 may be a central processing unit (CPU), microprocessor, and/or other hardware device suitable for retrieval and execution of instructions stored in machine readable storage medium 548. In the particular example shown in FIG. 5, processing resource 516 may receive, determine, and send instructions 550, 552, and 554. As an alternative or in addition to retrieving and executing instructions, processing resource 516 may include an electronic circuit comprising an electronic component for performing the operations of the instructions in machine readable storage medium 548. With respect to the executable instruction representations or boxes described and shown herein, it should be understood that part or all of the executable instructions and/or electronic circuits included within one box may be included in a different box shown in the figures or in a different box not shown.

Machine readable storage medium 548 may be any electronic, magnetic, optical, or other physical storage device that stores executable instructions. Thus, machine readable storage medium 548 may be, for example, Random Access Memory (RAM), an Electrically-Erasable Programmable Read-Only Memory (EEPROM), a storage drive, an optical disc, and the like. The executable instructions may be "installed" on the system 544 illustrated in FIG. 5. Machine readable storage medium 548 may be a portable, external or remote storage medium, for example, that allows the system 544 to download the instructions from the portable/external/remote storage medium. In this situation, the executable instructions may be part of an "installation package". As described herein, machine readable storage medium 548 may be encoded with executable instructions related to monitor calibration. That is, using processing resource 516, machine readable storage medium 548 may instruct generate and transmit calibration instructions to a monitor, among other operations.

Instructions 550 to analyze, by an external computing device, color measurements, when executed by processing resource 516, may cause system 544 to analyze, by an external computing device, color measurements received from a monitor. The color measurements can be wirelessly received from the monitor by a radio included in the external computing device.

Instructions 552 to generate, by the external computing device, calibration instructions, when executed by processing resource 516, may cause system 544 to generate, by the external computing device, calibration instructions for the monitor based on the recorded color measurements.

Instructions 554 to transmit, by the external computing device, the generated calibration instructions, when executed by processing resource 516, may cause system 544 to transmit, by the external computing device, the generated calibration instructions to the monitor. The generated calibration instructions can be wirelessly transmitted to the monitor by a radio included in the external computing device.

As used herein, "logic" is an alternative or additional processing resource to perform a particular action and/or element described herein. Logic can include hardware. The hardware can include processing resources such as circuitry, which are distinct from machine-readable instructions on a machine readable media. Further, as used herein, "a" can refer to one such thing or more than one such thing.

The above specification, examples and data provide a description of the method and applications, and use of the system and method of the disclosure. Since many examples can be made without departing from the spirit and scope of the system and method of the disclosure, this specification merely sets forth some of the many possible examples and implementations.

What is claimed is:

1. A system, comprising:
    a monitor, comprising:
        a scaler processing resource; and
        a memory resource storing machine readable instructions to cause the scaler processing resource to:
            record, by a sensor included in a sensor arm of a monitor, color measurements of the monitor in response to receiving record instructions from an external computing device, wherein the sensor arm is to allow the sensor to take the color measurements at different locations on the monitor;
            transmit the recorded color measurements to the external computing device;
            receive calibration instructions including a generated lookup table from the external computing device based on the recorded color measurements; and
            calibrate the monitor using the calibration instructions received from the external computing device by performing a conversion of the recorded color measurements from gamma-corrected space to linear space via the lookup table by performing gamut manipulation using matrix multiplication to modify a color setting of the monitor; and
    the external computing device, wherein the external computing device is to wirelessly transmit the calibration instructions to the monitor in response to the recorded color measurements exceeding a predetermined threshold of color.

2. The system of claim 1, including instructions to cause the scaler processing resource to wirelessly transmit the recorded color measurements to the external computing device via a radio.

3. The system of claim 1, including instructions to cause the scaler processing resource to wirelessly receive the calibration instructions wirelessly from the external computing device via a radio.

4. The system of claim 1, wherein the monitor does not include a system on chip (SOC) processing resource.

5. A non-transitory machine readable storage medium having stored thereon machine readable instructions to cause a processing resource to:
    receive, from a monitor, color measurements from a sensor included in a sensor arm of the monitor, wherein the sensor arm is to allow the sensor to take the color measurements at different locations on the monitor;
    analyze, by an external computing device, the color measurements received from the monitor;
    generate, by the external computing device, calibration instructions including a lookup table for the monitor based on the color measurements;
    transmit, by the external computing device, the generated calibration instructions to the monitor in response to the received recorded color measurements exceeding a predetermined threshold of color; and
    cause, by the monitor, calibration of the monitor using the transmitted calibration instructions by performing a conversion of the color measurements from gamma-corrected space to linear space via the lookup table by performing gamut manipulation using matrix multiplication to modify a color setting of the monitor.

6. The medium of claim 5, wherein the external computing device analyzes the recorded color measurements received from the monitor utilizing lookup tables.

7. The medium of claim 5, wherein the external computing device includes a radio to wirelessly receive the recorded color measurements from the monitor.

8. The medium of claim 5, wherein the generated calibration instructions include lookup tables including color calibration information.

9. The medium of claim 5, wherein the external computing device includes a radio to wirelessly transmit the generated calibration to the monitor.

10. A method, comprising:
    recording, by a colorimeter included in a sensor arm of a monitor, color measurements of a display of the monitor, wherein the sensor arm is to allow the colorimeter to take the color measurements at different locations on the display of the monitor;
    wirelessly transmitting, by a radio of the monitor, the recorded color measurements to an external computing device;
    generating, by the external computing device, calibration instructions including a lookup table for the monitor based on the received recorded color measurements;
    wirelessly transmitting, by the external computing device, the calibration instructions to the monitor in response to the received recorded color measurements exceeding a predetermined threshold of color; and
    calibrating, by a scaler processing resource of the monitor, the display of the monitor using the calibration instructions received from the external computing device by performing a conversion of the recorded color measurements from gamma-corrected space to linear space via the lookup table by performing gamut manipulation using matrix multiplication to modify a color setting of the monitor.

11. The method of claim 10, wherein the monitor is included in a monitor sub-group of a plurality of monitors.

12. The method of claim 11, wherein the method includes transmitting the calibration instructions to monitors included in the monitor sub-group.

13. The method of claim 10, wherein the method includes transmitting the calibration instructions at a predetermined time.

\* \* \* \* \*